United States Patent [19]

Apellaniz

[11] 4,138,092
[45] Feb. 6, 1979

[54] TAP FOR DISPENSING CARBONATED BEVERAGES

[75] Inventor: Ramon Apellaniz, Lasne-Chapelle-Saint-Lambert, Belgium

[73] Assignee: Euracom S.A., Brussels, Belgium

[21] Appl. No.: 776,614

[22] Filed: Mar. 14, 1977

[30] Foreign Application Priority Data

Apr. 14, 1976 [FR] France ................... 76 11067

[51] Int. Cl.² ............................................... F16K 3/16
[52] U.S. Cl. ................................ 251/325; 251/353; 141/362; 222/509
[58] Field of Search ............... 222/509, 505, 525, 531, 222/559, 514; 141/360, 362; 251/243, 325, 353; 137/320, 322

[56] References Cited

U.S. PATENT DOCUMENTS

| | | | |
|---|---|---|---|
| 174,344 | 3/1876 | Andrews | 251/282 X |
| 184,070 | 11/1876 | Fairbairn | 251/325 X |
| 243,324 | 6/1881 | Swank et al. | 251/325 X |
| 613,041 | 10/1898 | Kamerer | 251/325 X |
| 2,015,024 | 9/1935 | Yarnall | 251/325 X |
| 2,658,648 | 11/1953 | Tribbitt | 222/509 X |
| 2,710,707 | 6/1955 | Persak, Jr. | 141/362 X |
| 2,969,923 | 1/1961 | Fremion | 251/325 X |

FOREIGN PATENT DOCUMENTS 455347  10/1936  United Kingdom ................ 141/360

Primary Examiner—Robert J. Spar
Assistant Examiner—Charles A. Marmor
Attorney, Agent, or Firm—Bacon & Thomas

[57] ABSTRACT

The invention pertains to an improved tap, having a tap body provided with a liquid supply passage leading into a chamber which communicates with the outside of the body; an element which acts as a valve in the chamber and can move axially within the latter, this element comprising an axial passage, curved laterally towards the liquid supply passage; and a control part, pivotingly fitted to the body and linked to the valve element in order to move the latter.

2 Claims, 3 Drawing Figures

U.S. Patent
Feb. 6, 1979
4,138,092
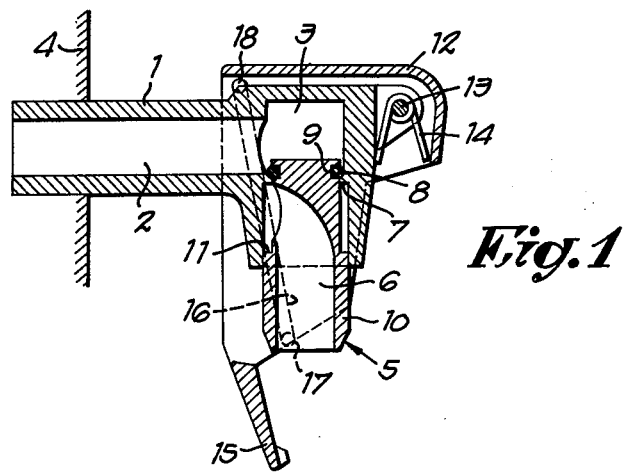
*Fig.1*
*Fig.2*
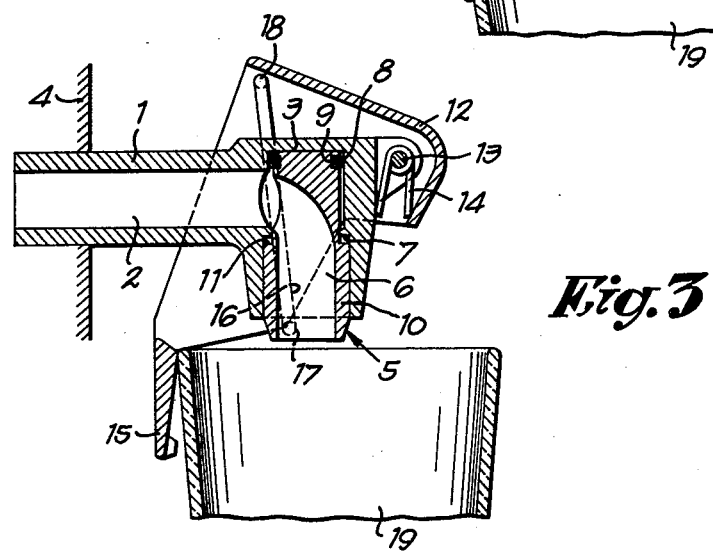
*Fig.3*

TAP FOR DISPENSING CARBONATED BEVERAGES

The present invention pertains to an improved tap, more particularly intended to equip devices or installations for the delivery, or the drawing off, of soda drinks.

It has already been suggested for uses of this kind, to have taps made so to be operated by pushing back of one of their constituent parts by means of the glass or the container which is to be filled.

These known taps generally offer one or more of the following drawbacks:
- elaborate construction and relatively high cost;
- creation of turbulence in the delivered liquid, thus giving rise to abundant froth formation;
- cleaning difficulties;
- difficult opening in the case of a liquid under relatively high pressure.

The purpose of the present invention is to provide an improved tap which offers none of the abovementioned inconveniences.

For this purpose, a tap is offered which comprises: a tap body provided with a liquid supply passage leading into a chamber having communication with the outside of the body; an element serving the purpose of a valve in aforesaid chamber and moving axially within same, this element comprising an axial passage curving sidewise towards aforesaid liquid supply passage; and a control element, hingedly fitted upon aforesaid body and linked to aforesaid valve element in order to move the latter.

Moreover, the axial passage in aforesaid valve element has an identical cross-section to that of aforesaid liquid supply passage.

For greater clearness, a form of embodiment of the invention will be described hereinafter as an example, with reference to the appended drawings wherein FIG. 1 is a sectional view through a tap of the present invention showing the same in closed position;

FIG. 2 is similar to FIG. 1 but shows the tap in partially opened condition; and FIG. 3 is like FIG. 2 but showing the tap in completely opened condition.

As illustrated, a tap according to the invention comprises a body 1 provided with a liquid supply passage 2 leading into a chamber 3 with outside communication.

This body 1 is intended to be attached to any appropriate element such as a pipe, a container, a drawing off device, etc. . . schematically shown as 4.

In chamber 3, an element 5 is located which acts as a valve, and can move axially within aforesaid chamber.

This element 5 comprizes an axial passage 6 which curves laterally towards aforesaid passage 2. Passage 6 has the same cross-section as passage 2.

Chamber 3 comprises, at the level of the lower part of passage 2, a peripheral rib 7 which acts as a seat for a sealing ring 8 which fits partially in a peripheral groove 9 of the upper part of element 5.

The part of chamber 3 located between aforesaid rib 7 and the free end of aforesaid passage has a diameter which is slightly greater than that of the remaining part of the chamber. Correspondingly, the lower part 10 of element 5 has an outer diameter which is slightly smaller than the diameter of the lower part of chamber 3. Element 5 thus defines an annular shoulder 11, which can cooperate with rib 7 as explained further on.

A control part 12 is pivotingly fitted at 13 to the body 1 of the tap. It is permanently stressed towards the position shown in FIG. 1 by a spring 14.

This part 12 extends downwardly to where it forms a control lever 15, below the free end of element 5.

This element 5 is linked to control part 12 by two links or stirrups, of which only one is shown at 16. The pivoting points 17 and 18 of these stirrups, respectively on element 5 and on part 12, are located on one and the same side with respect to the diametrical plane of element 5, perpendicular to the plane of the Figures.

When lever 15 is pushed back, for instance by the edge of a glass 19 to be filled, a first phase consists of a local detachment of ring 8 from its seat 7, as illustrated in FIG. 2. This slight detachment is sufficient for the liquid under pressure, contained in passage 2 and in the upper part of chamber 3, to pass through passage 6. There is consequently a pressure balance acting upon the head of element 5, which subsequently facilitates the operation of the latter.

By pushing lever 15 further back, element 5 is caused to rise as far as the upper end of its stroke, as shown in FIG. 3.

In this position, a passage of constant cross-section 2, 6 is offered to the liquid flowing from the tap. The cooperation between shoulder 11 and rib 7 assures a sufficient seal to avoid a disturbance of the flow of liquid.

It can thus be seen that this tap is extremely simple, reliable and of easy maintenance.

It is quite obvious that alterations of the details may be applied to the example described above, without going beyond the scope of the invention.

What I claim is:

1. A tap for dispensing carbonated beverages, comprising:
    a tap body having a chamber therein extending through an outer surface of the body;
    a supply passage in said body extending laterally from said chamber;
    a valve member slidable in said chamber and extending outwardly of said body through said outer surface and having an outer end;
    a dispensing passage in said valve member extending inwardly from its outer end then curving smoothly laterally toward said supply passage, said supply passage and all of said dispensing passage being of the same uniform cross section;
    a control member pivotally carried by said body and linked to said valve member for sliding said valve member in said chamber between a first position wherein said curved portion of said dispensing passage is aligned with said supply passage and a second position wherein said dispensing passage is displaced from said supply passage;
    said chamber being provided with a circular inwardly extending rib, between said supply passage and said outer surface, surrounding said valve member, a groove around said valve member adjacent the inner end thereof and a sealing ring in said groove sealingly engaging said rib when said valve member is in said second position; and
    said chamber and valve member being provided with cooperating stop shoulders limiting movement of said valve member to said first position.

2. A tap for dispensing carbonated beverages, comprising:

a tap body having a chamber therein extending through an outer surface of the body;

a supply passage in said body extending laterally from said chamber;

a valve member slidable in said chamber and extending outwardly of said body through said outer surface and having an outer end;

a dispensing passage in said valve member extending inwardly from its outer end then curving smoothly laterally toward said supply passage, said supply passage and all of said dispensing passage being of the same uniform cross section;

a control member pivotally carried by said body and linked to said valve member for sliding said valve member in said chamber between a first position wherein said curved portion of said dispensing passage is aligned with said supply passage and a second position wherein said dispensing passage is displaced from said supply passage;

said chamber being provided with a circular inwardly extending rib, between said supply passage and said outer surface, surrounding said valve member, a groove around said valve member adjacent the inner end thereof and a sealing ring in said groove sealingly engaging said rib when said valve member is in said second position; and means linking said control member to said valve member and being pivotally connected to said valve member laterally of the center line thereof whereby to tend to tilt said valve member and first lift one side of said sealing ring from said rib.

* * * * *